United States Patent
Reinhardt et al.

[11] Patent Number: 6,050,900
[45] Date of Patent: Apr. 18, 2000

[54] WELD JOINT OF BALANCING WEIGHTS ON THIN-WALLED SHAFTS

[75] Inventors: Rudolf Reinhardt, Esslingen; Helmut Horn, Bremen; Heinz Grünauer, Augsburg, all of Germany

[73] Assignee: DaimlerChrysler AG, Germany

[21] Appl. No.: 08/963,866

[22] Filed: Nov. 4, 1997

[30] Foreign Application Priority Data

Nov. 4, 1996 [DE] Germany ............................ 196 45 387

[51] Int. Cl.⁷ ...................................................... F16C 3/00
[52] U.S. Cl. ............................................ 464/180; 403/270
[58] Field of Search ..................................... 403/270, 271, 403/272, 265; 228/110.1, 262.5, 1.1; 156/73.1, 73.4, 580.1; 74/573 R; 464/180, 183, 181

[56] References Cited

U.S. PATENT DOCUMENTS

| | | | |
|---|---|---|---|
| 4,248,062 | 2/1981 | McLain et al. | 464/181 |
| 4,259,382 | 3/1981 | Schwan | 428/35.9 |
| 4,380,443 | 4/1983 | Federmann et al. | 464/181 |
| 4,887,989 | 12/1989 | Kerecman | 464/180 |
| 5,443,510 | 8/1995 | Shetty et al. | 419/2 |
| 5,620,652 | 4/1997 | Tack et al. | 420/532 |
| 5,722,896 | 3/1998 | Beagley et al. | 464/180 |
| 5,778,737 | 7/1998 | Welsh et al. | 74/573 R |
| 5,857,800 | 1/1999 | Nell | 403/271 X |

FOREIGN PATENT DOCUMENTS

| | | |
|---|---|---|
| 0353977A2 | 2/1990 | European Pat. Off. . |
| 0428908A1 | 5/1991 | European Pat. Off. . |
| 725619 | 1/1943 | Germany . |
| 3035437 | 5/1982 | Germany . |
| 40368 | 1/1983 | Germany .............................. 464/180 |
| 3931055 | 3/1991 | Germany . |
| 4431130 | 3/1996 | Germany . |
| 4434132 | 3/1996 | Germany . |
| 2 147 388 | 5/1985 | United Kingdom . |
| 2147388A | 5/1985 | United Kingdom . |

*Primary Examiner*—Lynne H. Browne
*Assistant Examiner*—David E. Bochna
*Attorney, Agent, or Firm*—Evenson, McKeown, Edwards & Lenahan, P.L.L.C.

[57] ABSTRACT

A spot weld joint of a balancing plate on the exterior side of a rotationally symmetrical, rotating hollow body such as a motor vehicle drive shaft. In order to also be able to balance thin-walled hollow bodies in a secure manner with respect to the process, as well as rapidly and durably in the case of different pairings of material of the hollow body and the balancing plate, the weld joint is constructed as an ultrasonic weld. The zone of thermal influence of the weld joint extends from the contact surface between the balancing plate and the hollow body maximally by approximately 0.3 mm, preferably approximately 0.1 to 0.15 mm, into the wall of the hollow body. Expediently, the zone of thermal influence extends deeper into the balancing plate than into the wall of the hollow body. Irrespective of the hollow shaft material—steel, aluminum or plastic—, the balancing plate may consist of a metal of high density, particularly of steel, brass or copper. In the case of fiber-reinforced hollow plastic shafts, the balancing body may also consist of plastic or of a metal strip coated with plastic on the contact side or of a sintered-together metal/plastic composite material.

15 Claims, 2 Drawing Sheets

WELD JOINT OF BALANCING WEIGHTS ON THIN-WALLED SHAFTS

BACKGROUND AND SUMMARY OF THE INVENTION

This application claims the priority of German Patent Application No. 19645387.9-45, filed on Nov. 4, 1996, the disclosure of which is expressly incorporated by reference herein.

The invention is based on a weld joint of balancing weights on rotationally symmetrical, rotating hollow bodies, as known, for example, from German Patent Document DE 39 31 055 A1.

Normally, rotationally symmetrical, rotating hollow bodies of the type addressed here, particularly hollow shafts or housings of hydrodynamic torque converters, have a certain unbalanced mass as a result of their manufacturing which must be compensated by a locally targeted fastening of a balancing mass selected according to the weight, mostly in the form of a sheet metal strip. The workpieces to be balanced usually consist of weldable steel so that the balancing plates can also be welded on. The fatigue strength of the hollow bodies and/or their wall thickness, as a rule, are also sufficiently high so that welds for the fastening of balancing plates can be easily carried out.

Normally, at least in the series production, the balancing masses are welded on by electric resistance welding, because these welds can be carried out fast, with low and constructionally small tool expenditures and securely with respect to the process. However, this type of welding requires a high denting stability of the shafts at the fastening point of the balancing plate so that the welding electrode can press the balancing plate to be welded on with the required high force against the shaft without any yield of the wall having a softened surface. On the other hand, when the wall thickness is sufficiently large, the zone of the thermal influence which occurs during the welding is small in comparison to the unaffected mass surrounding the zone of the thermal influence and can therefore be tolerated.

In the case of shaft and balancing plate materials, particularly aluminum, which cannot be welded by electric resistance welding, German Patent Document DE 30 35 437 C2 suggests a TIG weld on a small hole in the balancing plate. Here, the zone of the thermal influence is relatively large, and this type of balancing plate fastening is possible only in the case of thick-walled hollow bodies. British Patent Document GB 2 147 388 A recommends to rivet balancing plates to aluminum shafts, in which case a rivet body is previously butt-welded to the respective balancing point; the perforated balancing plate is fitted onto it; and the protruding rivet body end is made into a rivet head. Although this type of fastening permits an unlike pairing of materials, specifically heavy balancing plates made of steel or copper and an aluminum shaft, the welding-on of the rivet body causes a considerable zone of thermal influence. Furthermore, the cold forming-on of the rivet head requires a sufficient denting strength of the hollow shaft. For these reasons, this type of fastening technique is also limited to thicker-walled hollow shafts.

Although it is conceivable to weld balancing plates to the hollow shaft by means of laser welding which is said to leave only a very small zone of thermal influence, during the welding of balancing plates to hollow shafts by means of laser welds, the laser beam would, on the one hand, leave a still relatively large zone of thermal influence which represents a metallurgical weakening which, at least in the case of thin-walled hollow shafts, has an effect which is not negligible, irrespective of whether the weld beam direction is tangential to the balancing plate or to the wall of the hollow shaft or radial thereto. On the other hand, with respect to the investment volume, an expensive laser welding system would not be viable for such small welds. The system would only be used for its purpose, specifically for welding for a very short portion of the overall time. The remaining time, the system would be unused.

Because of the unavoidable zones of thermal influence and/or the force effects on the hollow shafts during the welding, it is therefore very difficult to rapidly and by means of a reliable process balance light-construction hollow shafts. Thin-walled shafts made of steel do not have the required denting strength to be able to withstand the radial contact pressure force of the electrodes during electric resistance welding. Thin-walled steel or aluminum shafts do not tolerate the thermal influence zones occurring during the welding which, in the case of thin-walled components, are very large relative to the direct environment and result in intolerable component weaknesses. Stress tests have shown that balanced, thin-walled shafts regularly fail at the balancing welds. The balancing welds represent metallurgical weaknesses from which the cracks or breaks originate in the case of a failure. According to the applicant's experiences, the problems during the welding-on of balancing plates start no later than at 2 mm when reducing the wall thickness of a corrugated pipe. The applicant has carried out electric resistance spot welding using rectified medium-frequency current and capacitor discharge welds. Despite certain differences in the welding result, metallurgical and partly also mechanical component weaknesses remained in both cases at the weld point which in dynamic stress tests were the starting point of a component failure.

Although in literature soldering or gluing are also mentioned as fastening techniques for balancing plates (compare, for example, German Patent Document DE-PS 725 619), these techniques have not been accepted at least in series production because they cannot be carried out rapidly and in this application are not secure with respect to the process and therefore not durable in every case because of a wide spread of relevant influential factors, such as the physical or chemical surface quality, the joining quality, and the like. Gluing of balancing weights is therefore at most limited to non-weldable materials or other recess applications. The balancing of filament-reinforced hollow plastic shafts also presents problems because at most glued connections are possible here which, however, cannot be carried out rapidly and at least in the case of balancing plate fastenings on the exterior side of shafts vary considerably in their quality.

It is an object of the invention to improve the weld joint of balancing weights of the above-mentioned type such that also thin-walled, rotating hollow bodies can be balanced securely with respect to the process, as well as rapidly and durably in the case of different pairings of the materials of the hollow body and the balancing plate.

Based on the above-mentioned weld joint, according to the invention, this object is achieved by using ultrasonic welding to form the weld joint. Because of the application of ultrasonic welding, a special case of friction welding, the welding heat is generated directly at the contact point itself between the balancing plate and the exterior surface of the corrugated pipe and does not have to be guided from the outside through the cross-sections to be welded together to the contact surface. As the result and because of the very rapid generating of heat by means of the high friction frequency, the zone of thermal influence and the resulting metallurgical stress concentration can be minimized. By means of ultrasonic welds, not only the same types of materials (St/St or Al/Al) can be welded to one another but also very different materials, for example, aluminum to steel or to copper; copper to steel; plastic-coated sheet metal to plastic; and other unlike pairings.

However, in the case of unlike pairings of metallic materials, particularly in the case of specifically heavy balancing weights made of steel or copper on light metal shafts, it must be taken into account that a contact corrosion may occur in the wet area, in which case the light metal, which is lower in the contact series, will be sacrificed. The reason is that, in the case of most current construction metals, the specific weight is connected with the position of the metal in the electrochemical contact series; that is, the heavier a metal, the nobler it is in the sense of this contact series. In order to prevent in such a case—for example, a steel balancing plate on an aluminum shaft—a pitting at the shaft, it is expedient to provide on the contact side of the balancing plate, an electrically insulating insulation layer around the weld and/or to provide a protective varnish on the exposed exterior side of the balancing weight and on the surrounding surface of the hollow shaft which prevent the entering of water into the weld and into the contact zone between the shaft surface and the balancing weight. Especially in the case of thin-walled hollow bodies, a corrosion and also a contact corrosion must be effectively prevented because thin-walled materials, because of their small wall thickness, contain only little "reserve". In rain and mainly in the winter because of the effect of thawing salt, drive shafts used in motor vehicles are very endangered by corrosion and possibly also by contact corrosion.

Although it is known that metals, specifically also steel types can be welded ultrasonically (compare German Patent Document DE 44 31 130 A1 or German Patent Document DE 44 34 132 A1), a person skilled in the art could find no information in this state of the art that the ultrasonic welding of balancing plates is particularly advantageous.

Other objects, advantages and novel features of the present invention will become apparent from the following detailed description of the invention when considered in conjunction with the accompanying drawings.

DETAILED DESCRIPTION OF THE DRAWINGS

Figure 1:
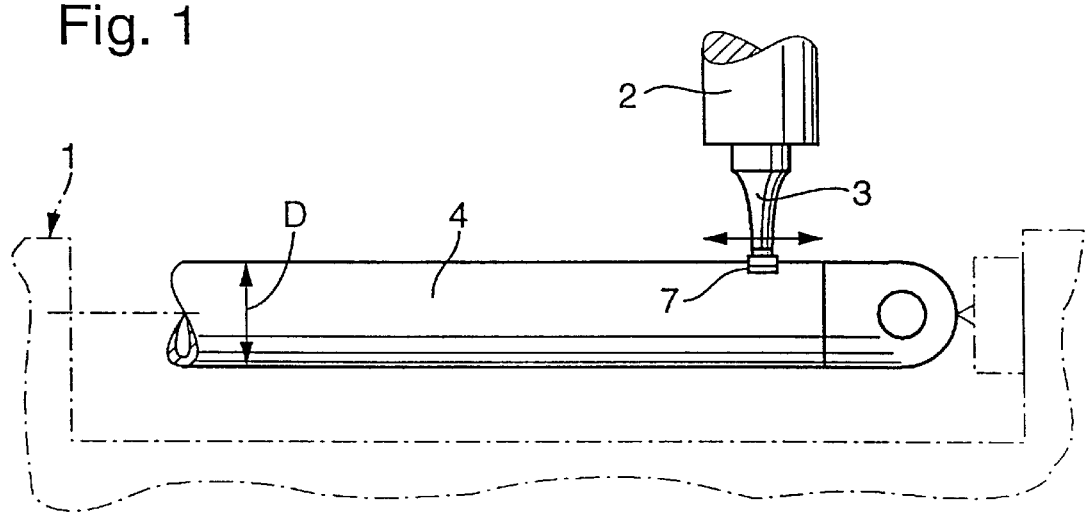
FIG. 1 is a schematic view of a hollow shaft clamped into a balancing machine, with an ultrasonic welding head for the welding-on of balancing weights in accordance with preferred embodiments of the present invention.

By means of a dash-dotted line, FIG. 1 illustrates a balancing machine 1 in which a hollow shaft 4 is accommodated which is to be balanced. In comparison to the shaft diameter D, the wall thickness s of the wall 5 of the hollow shaft is quite small. According to the comparative section of 1 mm shown on the left in FIG. 2, the wall thickness amounts, for example, to only approximately 1.3 mm. Welds were carried out on corrugated pipes with an outside diameter of 60 mm. In this example, the ratio of the wall thickness s to the outside diameter D amounts to 2.17% which relatively and also absolutely corresponds to a very light construction.

After the balancing test run of the hollow shaft 4 in the balancing machine, the shaft is rotated into such a circumferential position that the unbalanced mass, that is, the point with the excess of mass comes to be situated precisely opposite the circumferential position of the ultrasonic weld head integrated in the balancing machine and its sonotrode 3. By means of a suitable selecting and feeding device which is not shown, a balancing plate 7 which corresponds to the determined excess of mass of the unbalanced mass is first cut off a continuous strip corresponding to the weight or is selected from the precisely graduated supply of balancing plates of different weights, and this balancing plate 7 is fed in a positioned manner to the circumferential point of the hollow shaft facing the ultrasonic weld head.

Figure 3:
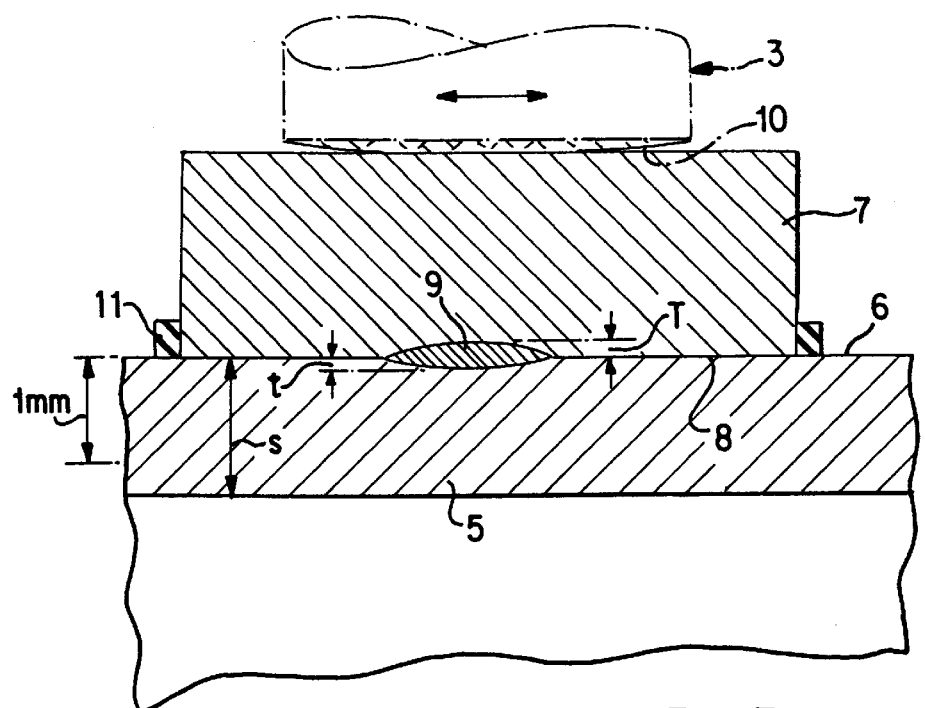
FIG. 3 is an enlarged individual sectional view of the weld formed utilizing the system of FIG. 1 where an electrically insulating insulation layer is shown arranged around the weld on the contact surface of the balancing body.
Figure 4:
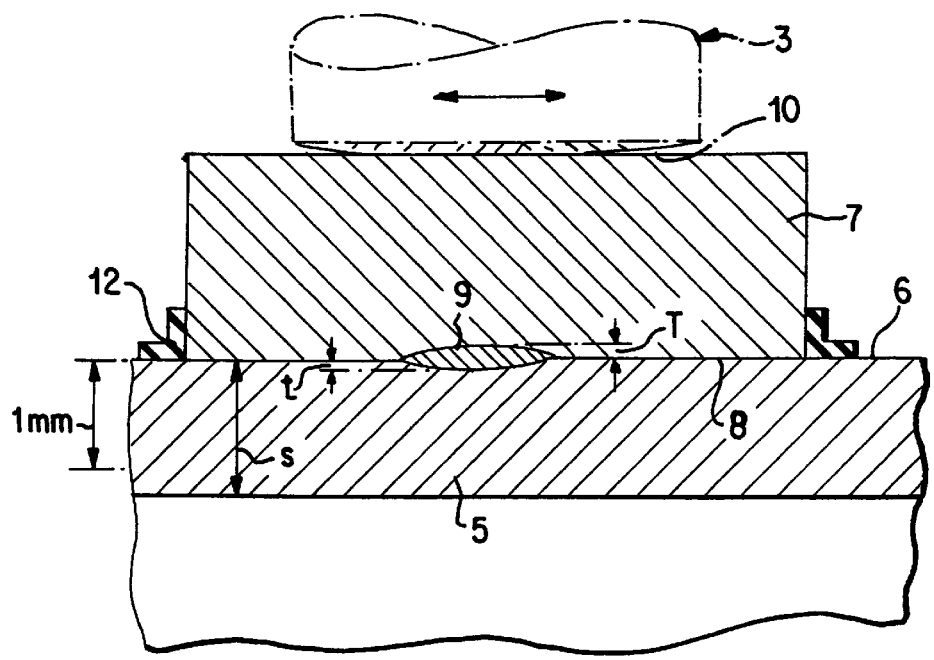
FIG. 4 is an enlarged individual sectional view of the weld formed utilizing the system of FIG. 1 where a protective varnish is provided on the exposed surface of the balancing body and on the surrounding surface area of the hollow body.

The ultrasonic weld head places its sonotrode 3 on the balancing plate and welds the balancing plate with its contact side 8 to the exterior surface of the wall 5. In this case, the sonotrode carries out transversal vibrations in the ultrasonic range and, while slightly pressing the balancing plate against the wall, generates frictional heat in the contact zone which leads to a thermally caused softening and welding together of the contacting parts. Expediently, the sonotrode is slightly embossed on its placing surface 10 so that a heating and welding zone is created whose diameter is smaller than that of the sonotrode. In addition, as in most cases, the placing surface can be artificially roughened by means of a pyramid structure so that, as the result of the pyramid peaks penetrating into the balancing plate, a form closure to the sonotrode is generated in the transversal direction. Where the balancing body is made of a specifically heavier material than the material of the hollow body, an electrically insulating insulation layer (11) (shown in FIG. 3) is arranged around the weld on the contact surface of the balancing body, or a protective vanish (12) (shown in FIG. 4) is provided on the exposed surface of the balancing body and on the surrounding surface area of the hollow body. The electrically insulating insulation layer (11) or the protective varnish (12) prevents water from getting into the weld and into the contact zone between the hollow body surface and the balancing body.

Figure 2:
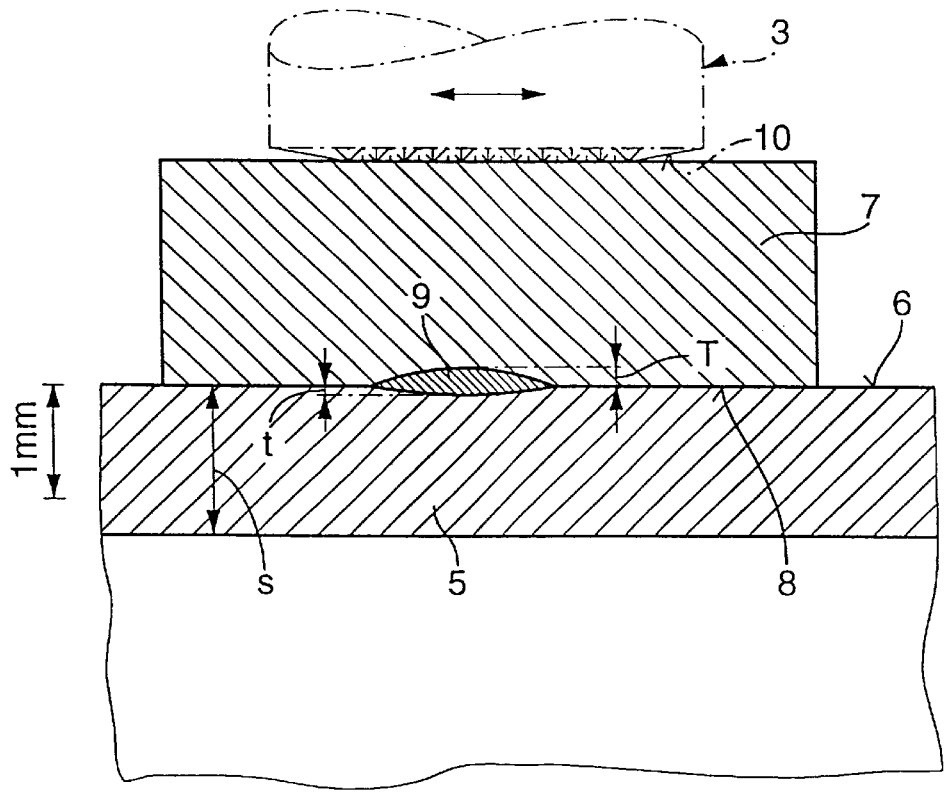
FIG. 2 is an enlarged individual longitudinal sectional view of the weld formed utilizing the system of FIG. 1.

Of special interest is the lens-shaped zone of thermal influence 9 which is shown in black in FIG. 2 and which is created during ultrasonic welding and is slightly larger than the direct welding zone itself. The zone of thermal influence is very flat and extends only slightly—extent t—into the wall 5 of the hollow shaft, whereas it is curved slightly more into the balancing plate—extent T. The metallurgical stress concentration which is therefore generated in the wall of the hollow shaft is only very slight and—if it is not negligible is at least tolerable and can be compensated by a corresponding extent when dimensioning the wall thickness—extent s—by a slight excess weight. In the case of a completed ultrasonic welding of a steel balancing plate on a steel hollow shaft, in the example of a hollow shaft mentioned above with respect to the measurements, a penetration depth t of the zone of thermal influence into the wall of only approximately 0.1 mm could be achieved. The balancing plate adhered very securely to the shaft. In contrast to other welding processes, in the small zone of thermal influence produced here, no coarse grain developed in the material structure which can be considered to be a special and surprising advantage of the present application of the ultrasonic welding process.

It should be mentioned that the ultrasonic welding is suitable not only for the material pairing of steel/steel or for the pairing of the same materials, for example, aluminum/aluminum, but by means of this process—with a suitable adaptation of the welding parameters—unlike metals or plastic materials can also easily be welded together. For example, in this manner, aluminum hollow shafts can be balanced by means of steel or copper balancing plates. The use of specifically heavy and, in the case of a given weight, thin balancing plates is preferred in the case of fast rotating hollow shafts because of lower wind noises of the thinner balancing plates. A balancing plate which has the same weight and has the same width and length dimensions is significantly thicker in aluminum (density approximately 2.7 $g/cm^3$) than in steel (density approximately 7.9 $g/cm^3$) or in copper (density approximately 8.9 $g/cm^3$). In contrast to a steel construction, an aluminum balancing plate, under comparable conditions, would have to be by a factor of 2.9 thicker and in comparison to copper, it would have to be by a factor of 3.4 thicker. This makes the material-inclusive ultrasonic welding particularly interesting for the balancing of light-construction shafts.

Plastic hollow shafts can also be balanced by means of ultrasonic welding if, and this is easily possible, the balancing plates are coated with a plastic coating with a high adhesiveness. If a weld is roughened on a fiber-reinforced duroplastic shaft, a thermoplastically coated balancing plate can even be "welded" to such a shaft by means of ultrasound in a durable manner and with a high stability because the softened thermoplastic material penetrates very finely into the rough areas of the shaft and hooks into them. This connection which is caused by ultrasound is a gluing by means of a thermoplastic material, in which case the "bonding agent" is softened and activated by the ultrasonic energy. Because of the fast softening of the plastic, the defined force effect and the rapid cooling, this type of gluing is not critical in comparison to conventional gluing because the influential factors which are relevant to the conventional gluing apply here to a lesser extent.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A balanced rotating hollow body, comprising:
a rotationally symmetrical rotating hollow body,
a balancing plate, and
a spot weld joint attaching the balancing plate on an exterior side of the rotationally symmetrical, rotating hollow body, wherein the weld joint is an ultrasonic weld and a zone of thermal influence of the ultrasonic weld extends from a contact surface between the balancing plate and the hollow body maximally by 0.3 mm into the wall of the hollow body.

2. Weld joint according to claim 1, wherein said zone of thermal influence extends maximally by approximately 0.1–0.15 mm into the wall of the hollow body.

3. Weld joint according to claim 1, wherein a zone of thermal influence extends from a contact surface between the balancing plate and the hollow body more into the balancing plate than into a wall of the hollow body.

4. Weld joint according to claim 1, wherein the hollow body consists of steel and the balancing plate consists of a material of a density of at least 7.8 $g/cm^3$.

5. Weld joint according to claim 4, wherein the balancing plate consists of steel, brass or copper.

6. Weld joint according to claim 1, wherein the hollow body consists of an aluminum alloy and the balancing plate consists of a material of a density of at least 7.8 $g/cm^3$.

7. Weld joint according to claim 6, wherein the balancing plate consists of steel, brass or copper.

8. Weld joint according to claim 1, wherein the hollow body consists of a fiber-reinforced plastic material and the balancing body also consists of a plastic material or of a metal strip coated with plastic on the contact side, or of a sintered-together metal/plastic composite material.

9. Weld joint according to claim 8, wherein the metal of the plastic-coated metal strip or of the metal/plastic composite material has a density of at least 7.8 $g/cm^3$.

10. Weld joint according to claim 1, wherein, in the case of a balancing body made of a specifically heavier material than the material of the hollow body, on the contact side of the balancing plate, an electrically insulating insulation layer is arranged around the weld which prevents the entering of water into the weld and into the contact zone between the hollow body surface and the balancing body.

11. Weld joint according to claim 1, wherein, in the case of a balancing body made of a specifically heavier material than the material of the hollow body, on the exposed surface of the balancing body and on the surrounding surface area of the hollow body, a protective varnish is provided which prevents an entering of water into the weld and into the contact zone between the hollow body surface and the balancing body.

12. Weld joint according to claim 1, wherein the hollow body is a motor vehicle drive shaft.

13. A balanced rotating hollow body, comprising:
a rotationally symmetrical, rotating hollow body,
a balancing plate, and
a spot weld joint attaching the balancing plate on an exterior side of the rotationally symmetrical, rotating hollow body, wherein the weld joint is an ultrasonic weld where a zone of thermal influence of the ultrasonic weld extends from a contact surface between the balancing plate and the hollow body maximally by 0.3 mm into the wall of the hollow body.

14. A balanced rotating hollow body, comprising:
a rotationally symmetrical rotating hollow body,
a balancing plate, and
a spot weld joint attaching the balancing plate on an exterior side of the rotationally symmetrical, rotating hollow body, wherein the weld joint is an ultrasonic weld, the hollow body consists of a fiber-reinforced plastic material and the balancing body consists of a plastic material or of a metal strip coated with plastic on the contact side, or of a sintered-together metal/plastic composite material.

15. A balanced hollow body, comprising:

a rotationally symmetrical, rotating hollow body, a balancing plate, and a spot weld joint attaching the balancing plate on an exterior side of the rotationally symmetrical, rotating hollow body, wherein the weld joint is an ultrasonic weld, the balancing body is made of a specifically heavier material than the material of the hollow body and an electrically insulating insulation layer is arranged around the weld on the contact surface of the balancing body which prevents entering of water into the weld and into the contact zone between the hollow body surface and the balancing body.

* * * * *